(12) United States Patent
Bluche

(10) Patent No.: US 10,558,893 B2
(45) Date of Patent: Feb. 11, 2020

(54) SYSTEMS AND METHODS FOR RECOGNIZING CHARACTERS IN DIGITIZED DOCUMENTS

(71) Applicant: A2IA S.A.S., Paris (FR)

(72) Inventor: Theodore Damien Christian Bluche, Paris (FR)

(73) Assignee: A2IA S.A.S., Paris (FR)

( * ) Notice: Subject to any disclaimer, the term of this patent is extended or adjusted under 35 U.S.C. 154(b) by 0 days.

(21) Appl. No.: 16/421,952

(22) Filed: May 24, 2019

(65) Prior Publication Data
US 2019/0279035 A1 Sep. 12, 2019

Related U.S. Application Data

(63) Continuation of application No. 15/481,754, filed on Apr. 7, 2017, now Pat. No. 10,354,168.
(Continued)

(51) Int. Cl.
| | | |
|---|---|---|
| *G06K 9/62* | (2006.01) | |
| *G06N 3/04* | (2006.01) | |
| *G06K 9/00* | (2006.01) | |
| *G06K 9/46* | (2006.01) | |
| *G06N 3/08* | (2006.01) | |

(52) U.S. Cl.
CPC ....... *G06K 9/6256* (2013.01); *G06K 9/00409* (2013.01); *G06K 9/00429* (2013.01); *G06K 9/4628* (2013.01); *G06N 3/0445* (2013.01); *G06N 3/0454* (2013.01); *G06K 2209/01* (2013.01); *G06N 3/082* (2013.01); *G06N 3/084* (2013.01)

(58) Field of Classification Search
None
See application file for complete search history.

(56) References Cited

U.S. PATENT DOCUMENTS

| | | | | |
|---|---|---|---|---|
| 5,271,068 A | * | 12/1993 | Ueda | .................... G06K 9/4609 382/156 |
| 5,812,698 A | * | 9/1998 | Platt | ................... G06K 9/00879 382/186 |

(Continued)

OTHER PUBLICATIONS

An End-to End Trainable Neural network—Recognition, Baoguang Shi et al., IEEE, 0162-8828, 2017, pp. 2298-2304 (Year: 2017).*

(Continued)

*Primary Examiner* — Jayesh A Patel
(74) *Attorney, Agent, or Firm* — Carter, Deluca & Farrell LLP

(57) ABSTRACT

Methods and systems are provided for end-to-end text recognition in digitized documents of handwritten characters over multiple lines without explicit line segmentation. An image is received. Based on the image, one or more feature maps are determined. Each of the one or more feature maps include one or more feature vectors. Based at least in part on the one or more feature maps, one or more scalar scores are determined. Based on the one or more scalar scores, one or more attention weights are determined. By applying the one or more attention weights to each of the one or more feature vectors, one or more image summary vectors are determined. Based at least in part on the one or more image summary vectors, one or more handwritten characters are determined.

20 Claims, 10 Drawing Sheets

Related U.S. Application Data

(60) Provisional application No. 62/320,912, filed on Apr. 11, 2016.

(56) References Cited

U.S. PATENT DOCUMENTS

| | | | | |
|---|---|---|---|---|
| 7,016,529 | B2* | 3/2006 | Simard | G06K 9/00422 382/155 |
| 9,807,473 | B2* | 10/2017 | Mei | H04N 21/8405 |
| 9,836,853 | B1* | 12/2017 | Medioni | G06N 3/0445 |
| 10,061,986 | B2* | 8/2018 | Sigal | G06T 7/62 |
| 10,198,671 | B1* | 2/2019 | Yang | G06T 11/60 |
| 10,354,168 | B2* | 7/2019 | Bluche | G06N 3/0445 |
| 10,387,776 | B2* | 8/2019 | Lin | G06N 3/0454 |
| 2017/0262996 | A1* | 9/2017 | Jain | G06T 7/143 |
| 2017/0308756 | A1* | 10/2017 | Sigal | G06T 7/62 |
| 2018/0060721 | A1* | 3/2018 | Kim | G06N 3/0445 |
| 2018/0063168 | A1* | 3/2018 | Sofka | H04L 63/1416 |
| 2018/0137389 | A1* | 5/2018 | Mathieu | G06K 9/00718 |
| 2018/0137410 | A1* | 5/2018 | Masuko | G06F 17/16 |
| 2018/0144248 | A1* | 5/2018 | Lu | G06F 17/241 |
| 2018/0174036 | A1* | 6/2018 | Han | G06N 3/082 |
| 2018/0314937 | A1* | 11/2018 | Zarar | G06N 3/08 |
| 2019/0114546 | A1* | 4/2019 | Anil | G06N 3/084 |
| 2019/0188848 | A1* | 6/2019 | Madani | G16H 10/60 |
| 2019/0228266 | A1* | 7/2019 | Habibian | G06K 9/6262 |
| 2019/0251340 | A1* | 8/2019 | Brown | G06K 9/00208 |
| 2019/0278835 | A1* | 9/2019 | Cohan | G06N 3/0445 |

OTHER PUBLICATIONS

Convolutional Long Short-Term Memory—Networks, Tara N. Sainath et al., IEEE, 978-1-4673-6997-8, 2015, pp. 4580-4584 (Year: 2015).*

Offline Handwriting recognition—Networks, Alex Graves et al., 2008, pp. 1-8 (Year: 2008).*

The A2iA Arabic—Evaluation, Theodore Bluche et al., 2014, pp. 1-5 (Year: 2014).*

Describing Mutimedia Content—Networks, Kyunghyum Cho et al., 2015, pp. 1-12 (Year: 2015).*

Feature Design—automated?., Youssouf Chherawala et al., CPS, 1520-5363, 2013, pp. 290-294 (Year: 2013).*

Dropout improves—Recognition, Vu Pham et al., Mar. 2014, pp. 1-6 (Year: 2014).*

Acoustic modelling—LSTM RNNS, Andrew Senior et al., IEEE, 978-1-4799-7291-3, 2015, pp. 604-609 (Year: 2015).*

Jimmy Ba, Volodymyr Mnih, and Koray Kavukcuoglu. Multiple object recognition with visual attention. arXiv preprint arXiv:1412.7755, 2014.

Dzmitry Bandanau, Kyunghyun Cho, and Yoshua Bengio. Neural machine translation by jointly learning to align and translate. arXiv preprint arXiv:1409.0473, 2014.

Yoshua Bengio, Yann LeCun, Craig Nohl, and Chris Burges. Lerec: A NN/HMM hybrid for online handwriting recognition. Neural Computation, 7(6):1289-1303, 1995.

Yoshua Bengio, Jérôme Louradour, Ronan Collobert, and Jason Weston. Curriculum learning. In ICML, p. 6, 2009.

A.-L. Bianne, F. Menasri, R. Al-Hajj, C. Mokbel, C. Kermorvant, and L. Likforman-Sulem. Dynamic and Contextual Information in HMM modeling for Handwriting Recognition. IEEE Trans. on Pattern Analysis and Machine Intelligence, 33(10):2066-2080, 2011.

Théodore Bluche, Hermann Ney, and Christopher Kermorvant. Feature Extraction with Convolutional Neural Networks for Handwritten Word Recognition. In 12th International Conference on Document Analysis and Recognition (ICDAR). pp. 285-289. IEEE, 2013.

William Chan, Navdeep Jaitly, Quoc V Le, and Oriol Vinyals. Listen, attend and spell. arXiv preprint arXiv:1508.01211, 2015.

Kyunghyun Cho, Aaron Courville, and Yoshua Bengio. Describing multimedia content using attention-based encoder-decoder networks. Multimedia, IEEE Transactions on, 17(11):1875-1886, 2015.

Jan Chorowski, Dzmitry Bandanau, Kyunghyun Cho, and Yoshua Bengio. End-to-end continuous speech recognition using attention-based recurrent NN: first results. arXiv preprint arXiv:1412.1602, 2014.

Jan K Chorowski, Dzmitry Bandanau, Dmitriy Serdyuk, Kyunghyun Cho, and Yoshua Bengio. Attention-based models for speech recognition. In Advances in Neural Information Processing Systems, pp. 577-585, 2015.

A Graves, S Fernández, F Gomez, and J Schmidhuber. Connectionist temporal classification: labelling unsegmented sequence data with recurrent neural networks. In International Conference on Machine learning, pp. 369-376, 2006.

A. Graves and J. Schmidhuber. Offline Handwriting Recognition with Multidimensional Recurrent Neural Networks. In Advances in Neural Information Processing Systems, pp. 545-552, 2008.

Alex Graves. Sequence Transduction with Recurrent Neural Networks. In ICML, 2012.

Alex Graves. Generating sequences with recurrent neural networks. arXiv preprint arXiv:1308.0850, 2013.

Alex Graves, Greg Wayne, and Ivo Danihelka. Neural turing machines. arXiv preprint arXiv:1410.5401, 2014.

Karol Gregor, Ivo Danihelka, Alex Graves, and Daan Wierstra. DRAW: A recurrent neural network for image generation. arXiv preprint arXiv:1502.04623, 2015.

Max Jaderberg, Karen Simonyan, Andrew Zisserman, et al. Spatial transformer networks. In Advances in Neural Information Processing Systems, pp. 2008-2016, 2015.

Chen-Yu Lee and Simon Osindero. Recursive recurrent nets with attention modeling for ocr in the wild. arXiv preprint arXiv:1603.03101, 2016.

Vu Pham, Théodore Bluche, Christopher Kermorvant, and Jérôme Louradour. Dropout improves re-current neural networks for handwriting recognition. In 14th International Conference on Frontiers in Handwriting Recognition (ICFHR2014), pp. 285-290, 2014.

Baoguang Shi, Xinggang Wang, Pengyuan Lv, Cong Yao, and Xiang Bai. Robust scene text recognition with automatic rectification. arXiv preprint arXiv:1603.03915, 2016.

Søren Kaae Sønderby, Casper Kaae Sønderby, Lars Maaløe, and Ole Winther. Recurrent spatial trans-former networks. arXiv preprint arXiv:1509.05329, 2015.

Kelvin Xu, Jimmy Ba, Ryan Kiros, Aaron Courville, Ruslan Salakhutdinov, Richard Zemel, and Yoshua Bengio. Show, attend and tell: Neural image caption generation with visual attention. arXiv preprint arXiv:1502.03044, 2016.

S. Edelman, T. Flash, and S. Ullman, "Reading cursive hand-writing by alignment of letter prototypes," International Journal of Computer Vision, vol. 5, No. 3, pp. 303-331, 1990.

G. Kim and V. Govindaraju, "A lexicon driven approach to handwritten word recognition for real-time applications," Pattern Analysis and Machine Intelligence, IEEE Transactions on, vol. 19, No. 4, pp. 366-379, 1997.

M. Morita, A. El Yacoubi, R. Sabourin, F. Bortolozzi, and C. Y. Suen, "Handwritten month word recognition on Brazilian bank cheques," in Document Analysis and Recognition, 2001. Proceedings. Sixth International Conference on. IEEE, 2001, pp. 972-976.

R. G. Casey and E. Lecolinet, "A survey of methods and strategies in character segmentation," Pattern Analysis and Machine Intelligence, IEEE Transactions on, vol. 18, No. 7, pp. 690-706, 1996.

T. Plötz and G. A. Fink, "Markov models for offline handwriting recognition: a survey," International Journal on Document Analysis and Recognition (IJDAR), vol. 12, No. 4, pp. 269-298, 2009.

S. Wang, S. Uchida, and M. Liwicki, "Part-based method on hand-written texts," in Pattern Recognition (ICPR), 2012 21st International Conference on. IEEE, 2012, pp. 339-342.

Y. LeCun, L. Bottou, Y. Bengio, and P. Haffner, "Gradient-based learning applied to document recognition," Proceedings of the IEEE, vol. 86, No. 11, pp. 2278-2324, 1998.

N. Stamatopoulos, G. Louloudis, and B. Gatos, "Efficient transcript mapping to ease the creation of document image segmentation ground truth with text-image alignment," in Frontiers in Handwriting Recognition (ICFHR), 2010 International Conference on. IEEE, 2010, pp. 226-231.

(56) References Cited

OTHER PUBLICATIONS

T. Bluche, B. Moysset, and C. Kermorvant, "Automatic line segmentation and ground-truth alignment of handwritten documents," in International Conference on Frontiers in Handwriting Recognition (ICFHR), 2014.

G. Louloudis, B. Gatos, I. Pratikakis, and C. Halatsis, "Text line and word segmentation of handwritten documents," Pattern Recognition, vol. 42, No. 12, pp. 3169-3183, Dec. 2009.

A. Nicolaou and B. Gatos, "Handwritten Text Line Segmentation by Shredding Text into its Lines," International Conference on Document Analysis and Recognition, 2009.

R. Saabni and E.-S. Jihad, "Language-Independent Text Lines Extraction Using Seam Carving," in International Conference of Document Analysis and Recognition, 2011.

Z. Shi, S. Setlur, and V. Govindaraju, "A Steerable Directional Local Profile Technique for Extraction of Handwritten Arabic Text Lines," in International Conference on Document Analysis and Recognition, 2009.

M. Delakis and C. Garcia, "text detection with convolutional neural networks." in VISAPP (2), 2008, pp. 290-294.

K. Jung, "Neural network-based text location in color images," Pattern Recognition Letters, vol. 22, No. 14, pp. 1503-1515, 2001.

B. Moysset, C. Kermorvant, C. Wolf, and J. Louradour, "Paragraph text segmentation into lines with recurrent neural networks," in International Conference of Document Analysis and Recognition (ICDAR), 2015.

B. Moysset, P. Adam, C. Wolf, and J. Louradour, "Space displacement localization neural networks to locate origin points of handwritten text lines in historical documents," in International Workshop on Historical Document Imaging and Processing (HIP), 2015.

T. Bluche, J. Louradour, M. Knibbe, B. Moysset, M. F. Benzeghiba, and C. Kermorvant, "The A2iA Arabic Handwritten Text Recognition System at the Open HaRT2013 Evaluation," in 11th IAPR International Workshop on Document Analysis Systems (DAS). IEEE, 2014, pp. 161-165.

E. Augustin, M. Carré, E. Grosicki, J.-M. Brodin, E. Geoffrois, and F. Preteux, "RIMES evaluation campaign for handwritten mail processing," in Proceedings of the Workshop on Frontiers in Handwriting Recognition, No. 1, 2006.

C. Xiong, S. Merity, and R. Socher, "Dynamic memory net-works for visual and textual question answering," arXiv preprint arXiv:1603.01417, 2016.

Théodore Bluche. Deep Neural Networks for Large Vocabulary Handwritten Text Recognition. Theses, Université Paris Sud—Paris XI, May 2015.

Théodore Bluche, Jérôme Louradour, and Ronaldo Messina. Scan, Attend and Read: End-to-End Hand-written Paragraph Recognition with MDLSTM Attention. arXiv preprint arXiv:1604.03286, 2016.

Horst Bunke, Samy Bengio, and Alessandro Vinciarelli. Offline recognition of unconstrained handwritten texts using hmms and statistical language models. Pattern Analysis and Machine Intelligence, IEEE Transactions on, 26(6):709-720, 2004.

Patrick Doetsch, Michal Kozielski, and Hermann Ney. Fast and robust training of recurrent neural networks for offline handwriting recognition. pages-, 2014.

Justin Johnson, Andrej Karpathy, and Li Fei-Fei. Densecap: Fully convolutional localization networks for dense captioning. arXiv preprint arXiv:1511.07571, 2015.

Michal Kozielski, Patrick Doetsch, Hermann Ney, et al. Improvements in RWTH's System for Off-Line Handwriting Recognition. In Document Analysis and Recognition (ICDAR), 2013 12th International Conference on, pp. 935-939. IEEE, 2013.

R. Messina and C. Kermorvant. Surgenerative Finite State Transducer n-gram for Out-Of-Vocabulary Word Recognition. In 11th IAPR Workshop on Document Analysis Systems (DAS2014), pp. 212-216, 2014.

Pierre Sermanet, David Eigen, Xiang Zhang, Michael Mathieu, Rob Fergus, and Yann LeCun. Over-feat: Integrated recognition, localization and detection using convolutional networks. arXiv preprint arXiv:1312.6229, 2014.

* cited by examiner

Left panel:

The effect of bottom congestion due to ~~the high pressure is inevitably mixed~~ ~~with that of the suitability of ground~~ ~~for spawning~~. Both result in crowding, so there is no need to try to separate them – thank Heaven! A good picture of this is seen on the 150 miles of spawning grounds from the Viking in the north down to the Klondykes and the Reef along the western edge of the Norwegian Deep.

Right panel:

The modus would be the same in both ~~present to~~ ~~serve the frame of this; in which his heart lay.~~ ~~Here, the rooted ironic charm was disarming. Yet~~ ~~when the time came to take up, to any still a de-~~ ~~pressing weight~~. he left Mr. Halliday's office, exactly a month ago. If even no statesmen only did what they had to do to get GO on an expanding scale, and left the sum-total of their actions, and their lunar and earthly repercussions, to luck (or to Noble), there was a vacuum where there should be a centre of trust, responsible for the maintenance

FIG. 5

SYSTEMS AND METHODS FOR RECOGNIZING CHARACTERS IN DIGITIZED DOCUMENTS

CROSS REFERENCE TO RELATED APPLICATIONS

The present application is a continuation of U.S. patent application Ser. No. 15/481,754, filed on Apr. 7, 2017, which claims the benefit of and priority to U.S. Provisional Patent Application No. 62/320,912, filed on Apr. 11, 2016. The entire contents of each of the foregoing applications are hereby incorporated herein by reference.

BACKGROUND

Technical Field

The present disclosure relates to systems and methods for text recognition in digitized documents. More particularly, the present disclosure relates to systems and methods for recognizing characters in digitized documents without line segmentation.

Background of Related Art

In recent years, with the popularity of mobile devices with built-in cameras, it is easier to capture an image of a document. Several techniques are available that identify the text in the image of the document by segmenting the characters in the image to identify or recognize each character in the image. Such techniques involve extracting features from the image using vertical frames from the text lines in the image.

Other techniques utilize recurrent neural networks to predict the characters that are next in the sequence. Such techniques also rely on segmented text lines to predict the next character. However, segmented text lines are not always readily available. Therefore, techniques that depend on segmented text lines need a complete processing pipeline, which relies on the automatic line segmentation algorithms, in order to transcribe the image of the document or the digitized document.

SUMMARY

According to an aspect of the present disclosure, methods and systems are provided for recognizing and transcribing text in digitized documents without line segmentation. In an aspect of the present disclosure, a computer-implemented method for recognizing handwritten characters over multiple lines is provided. The method includes receiving an image of a document including multiple handwritten characters and determining, based on the image, one or more feature maps. Each of the one or more feature maps includes one or more feature vectors. The method further includes determining, based at least in part on the one or more feature maps, one or more scalar scores; determining, based on the one or more scalar scores, one or more attention weights; determining, by applying the one or more attention weights to each of the one or more feature vectors, one or more image summary vectors; and determining, based at least in part on the image summary vector, one or more handwritten characters in a sequence of characters.

In another aspect of the present disclosure, the computer-implemented method includes determining the size of the image and determining the number of the feature maps based in part on the size of the image.

In another aspect of the present disclosure, the computer-implemented method includes displaying the recognized plurality of handwritten characters on a display device.

In another aspect of the present disclosure, the recognized plurality of handwritten characters represent a line of handwritten characters within the image.

In yet another aspect of the present disclosure, the computer-implemented method includes determining, based at least in part on the one or more image summary vectors, one or more probability vectors comprising probability values, and the one or more characters of the handwritten characters is recognized based at least in part on the probability values of the probability vectors.

In yet another aspect of the present disclosure, the computer-implemented method includes determining, based on the number of the one or more feature maps, a dimension of the one or more image summary vectors.

In yet another aspect of the present disclosure, the computer-implemented method includes encoding the image, extracting one or more features from the image, and determining the one or more feature maps based at least in part on the features extracted from the image.

In yet another aspect of the present disclosure, the computer-implemented method includes determining a dimension of the image, and determining, based on the dimension of the image, a dimension of each of the one or more feature maps.

In still another aspect of the present disclosure, the computer-implemented method includes determining, based on the number of the one or more feature maps, a dimension for each of the one or more feature vectors.

In still another aspect of the present disclosure, each of the one or more scalar scores correspond to a particular column coordinate of the image.

In another aspect of the present disclosure, the computer-implemented method includes determining, by applying the one or more attention weights to each of the one or more feature vectors, an image summary vector sequence; and determining, based at least in part on the image summary vector sequence, a next character subsequence in a sequence of characters.

In accordance with another aspect of the present disclosure, a system for recognizing multiple handwritten characters over multiple lines is provided. The system includes an image capturing device configured to capture an image of a document including one or more handwritten characters; at least one processor and at least one memory coupled to the at least one processor, the at least one memory having instructions stored thereon, which, when executed by the at least one processor, cause the processor to: receive the image of the document including the plurality of handwritten characters; determine, based at least in part on the image, a plurality of feature maps, each of which includes a plurality of feature vectors corresponding to the respective plurality of handwritten characters; determine, based at least in part on the plurality of feature maps, a plurality of scalar scores; determine, based on the plurality of scalar scores, a plurality of attention weights; determine, by applying the plurality of attention weights to each of the plurality of feature vectors, a plurality of image summary vectors; and recognize, based at least in part on the plurality of image summary vectors, the plurality of handwritten characters; a display device configured to display the plurality of recognized handwritten characters.

In another aspect of the present disclosure, the instructions, when executed by the at least one processor, further cause the processor to determine the size of the image, and the number of the plurality of feature maps is based at least in part on the size of the image.

In another aspect of the present disclosure, the instructions, when executed by the at least one processor, further cause the processor to: determine, based at least in part on the plurality of image summary vectors, a respective plurality of probability vectors comprising probability values, and the one or more characters of the plurality of handwritten characters is recognized based at least in part on the probability values of the probability vectors.

In yet another aspect of the present disclosure, the instructions, when executed by the at least one processor, further cause the processor to determine, based on the number of the plurality of feature maps, a dimension of the plurality of image summary vectors.

In yet another aspect of the present disclosure, the instructions, when executed by the at least one processor, further cause the processor to encode the image and extract a plurality of features from the image, and the plurality of feature maps are determined based at least in part on the plurality of features extracted from the image.

In yet another aspect of the present disclosure, the instructions, when executed by the at least one processor, further cause the processor to determine a dimension of the image and determine, based on the dimension of the image, a dimension of each of the plurality of feature maps.

In yet another aspect of the present disclosure, the instructions, when executed by the at least one processor, further cause the processor to determine, based on the number of the plurality of feature maps, a dimension for each of the plurality of feature vectors.

BRIEF DESCRIPTION OF THE DRAWINGS

Various embodiments of the present disclosure are described with reference to the accompanying drawings wherein:

FIG. 5 illustrates examples of recognition of characters over multiple lines in images, in accordance with an embodiment of the present disclosure.

DETAILED DESCRIPTION

The systems and methods of the present disclosure enable end-to-end text recognition and automatic transcription of digitized documents without segmentation of the digitized documents. Using these techniques, transcription of digitized documents whose text lines are not segmented and readily available is also enabled.

Systems and methods described in the present disclosure implement various techniques based on neural networks. In some embodiments, the neural networks may be convolutional neural networks in which the two dimensional structure of the image is maintained in several layers, and local receptors of the convolutional neural networks are defined through training of the convolutional neural network. The local receptors are repeated at each position of the two dimensional structure image. The output of each receptor may be arranged in feature maps, and with each iteration, more and more complex representations of the image are extracted from the image. Subsampling operations, such as max pooling, may reduce the size of the maps. The convolutional neural network may provide a character sequence by performing a classification at each horizontal position of the maps. The classification performed at each horizontal position may be based on a function that has been realized based on the training of the convolutional neural network.

Multi-dimensional recurrent neural networks, including multi-dimensional long short-term memory recurrent neural networks, associated with connectionist temporal classification objective function applying the above concepts yield low error rates. Multi-dimensional long short-term memory recurrent neural networks combine convolutional layers and long short-term memory recurrences. The transformation from the two dimensional structure of the image to the one dimension characters is delayed until just before the character predictions.

The systems and methods described in the present disclosure do not rely upon explicitly segmented line texts, which are rarely readily available in real-world applications and are also expensive to obtain for training the systems and methods. Among the many issues with explicit line segmentation are degradation of performance of the entire system and evaluation of line segmentation as the line segmentation methods are sensitive to other markings in the image.

Rather, the systems and methods described in the present disclosure utilize attention-based techniques. The systems and methods described in the present disclosure may identify content at specific locations and in some embodiments, in a specific order. The systems and methods described herein may implement a multi-dimensional long short term memory architecture with a decoder unit that iteratively predicts one or more characters at each iteration. The decoder unit may replace the collapse layer in the multi-dimensional long short term memory architecture.

Figure 1:
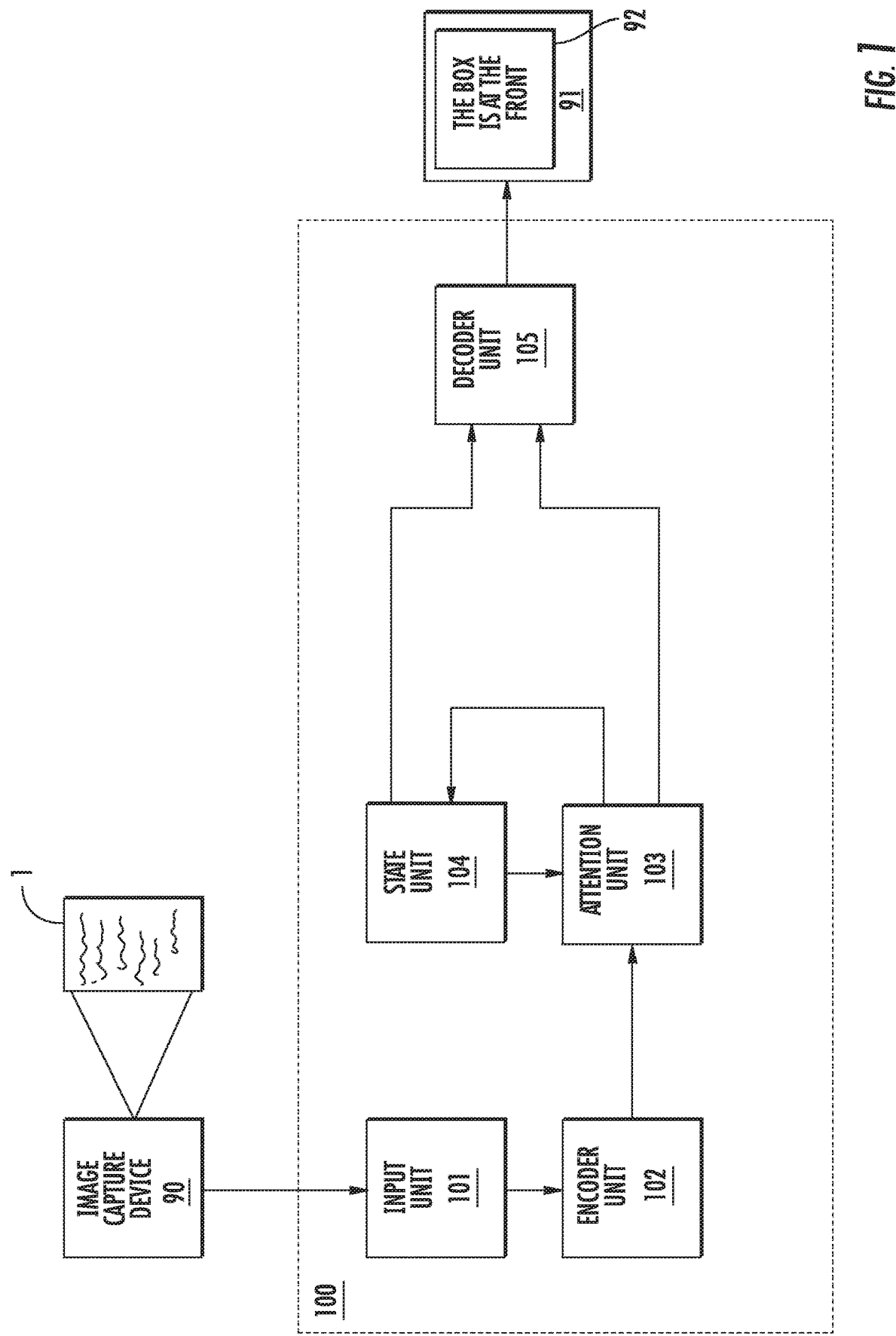
FIG. 1 illustrates an example arrangement of an end-to-end text recognition system without line segmentation, in accordance with an embodiment of the present disclosure.

FIG. 1 depicts an exemplary arrangement of an end-to-end text recognition system without line segmentation (referred to herein as "system") 100 configured with an image capturing device 90 and a display device 91. Image capturing device 90 may be configured to capture one or more images of text such as text in document 1. Document 1 may be any type of a document including any type of data including images, printed text, and hand-written text. Image capturing device 90 may be configured to transmit the one or more captured images to the system 100. In some embodiments, image capturing device 90 may be configured to transmit the one or more images to input unit 101 of the system 100. In some embodiments, image capturing device 90 and system 100 are configured within a computing device, such as a mobile computing device. Display device 91 may be configured to display information received from system 100. Display device 91 may be any type of a display including, but not limited to, monitors, televisions, display devices of mobile computing devices, and mobile telephones. In some embodiments, image capturing device 90, system 100, and display device 91 may be configured within a computing device, such as a mobile computing device.

The system 100 includes multiple units, such as input unit 101, encoder unit 102, attention unit 103, state unit 104, and decoder unit 105. The system 100 is configured within a computing device (not shown separately). The computing device includes one or more processors (not shown) and one or memory units (not shown) operably coupled to the one or more processors. The system 100 may be implemented using the one or more processors and the one or more memory units. The one or more processors may be configured to retrieve data from and store data in a data storage unit. The one or more processors may be any type of suitable processors that are adapted to perform or execute the techniques or operations or instructions described herein. For example, the processors may be hardware processors programmed to perform the techniques described herein pursuant to the instructions in firmware, memory, or other storage, or a combination thereof. Similarly, the processors may also be one or more application specific integrated circuits (ASICs), field programmable gate arrays (FPGAs) that are persistently programmed to perform the techniques or operations described herein. The processors may also be a central processing unit (CPU), a digital signal processor (DSP), a microprocessor, a graphical processing unit (GPU), or any other device that incorporates hard wired logic or program logic or both to perform the operations or techniques described herein.

The one or more memory units store instructions, such as instructions (in an example, software), to be executed by the one or more processors, and the techniques described herein are performed by the computing device in response to the one or more processors executing the instructions stored in the one or more memory units. The one or more memory units may be any type of hardware device used to store data. The one or more memory units may be volatile memory, such as random access memory (RAM) (e.g., dynamic random access memory (DRAM), static random access memory (SRAM), etc.). The one or more memory units may be non-volatile memory, such as read-only memory (ROM) (e.g., programmable read-only memory (EPROM), electrically erasable programmable read-only memory (EEPROM), non-volatile RAM (NVRAM), etc.). The one or more memory units may also be magnetic, optical, or electrical media. As will be appreciated, the processor and the memory units implementation is provided by way of example only, and should not be construed as limiting. For instance, procedures of any of the embodiments of the present disclosure may be implemented by hardware components, firmware components, software components, and/or any combination thereof. In some embodiments, the image capturing device 90 is operably coupled with one or more processors and one or more memory units. The image capturing device 90 may be configured to receive one or more instructions to capture images and image capturing device 90 may capture one or more images based in part on the one or more instructions stored in the one or more memory units and executed by the one or more processors.

System 100 may be employed in accordance with various example embodiments described herein. System 100 may be implemented using various neural networks for the different units described below, such as recurrent neural networks, long short-term memory neural networks, multi-dimensional long short-term memory neural networks, convolutional neural networks, and multi-layer perceptrons (MLP).

The input unit 101 may be configured to receive one or more images from multiple computing devices and image capturing devices, such as the image capturing device 90. Input unit 101 may be configured to determine the size of the one or more images. The size of the one or more images may be determined in terms of width and height of the image. In some embodiments, the width and height of the image may be determined in terms of pixels. As described herein, a received image is denoted by I and the received image I may be of dimension W×H, representing the width and height of the image I, respectively. Input unit 101 may perform certain transformations of the image, such as rescaling the image dimensions or the pixel values. Input unit 101 may be configured to transmit each of the received images to encoder unit 102.

The encoder unit 102 may be configured to encode the received image I using a neural network. Encoding image I includes extracting features from the received image I and determining feature vectors and feature maps from the received image I. Each of the determined feature maps may be of dimension W"×H'≤W×H. Each of the feature vectors may be determined according to the following equation:

$$e_{ij}=\text{Encoder}(I) \quad (1)$$

where $e_{ij}$ is the feature vector at coordinate (i, j) in a feature map determined from received image I. The dimension of each feature vector may be based on the number of feature maps. For example, if the number of feature maps that are determined is 10 then each feature vector is of dimension 10. The number of feature maps that are determined from image I is depicted herein as E. Therefore, the dimension of each feature vector that is determined from equation (1) above may be of dimension E.

Figure 2:
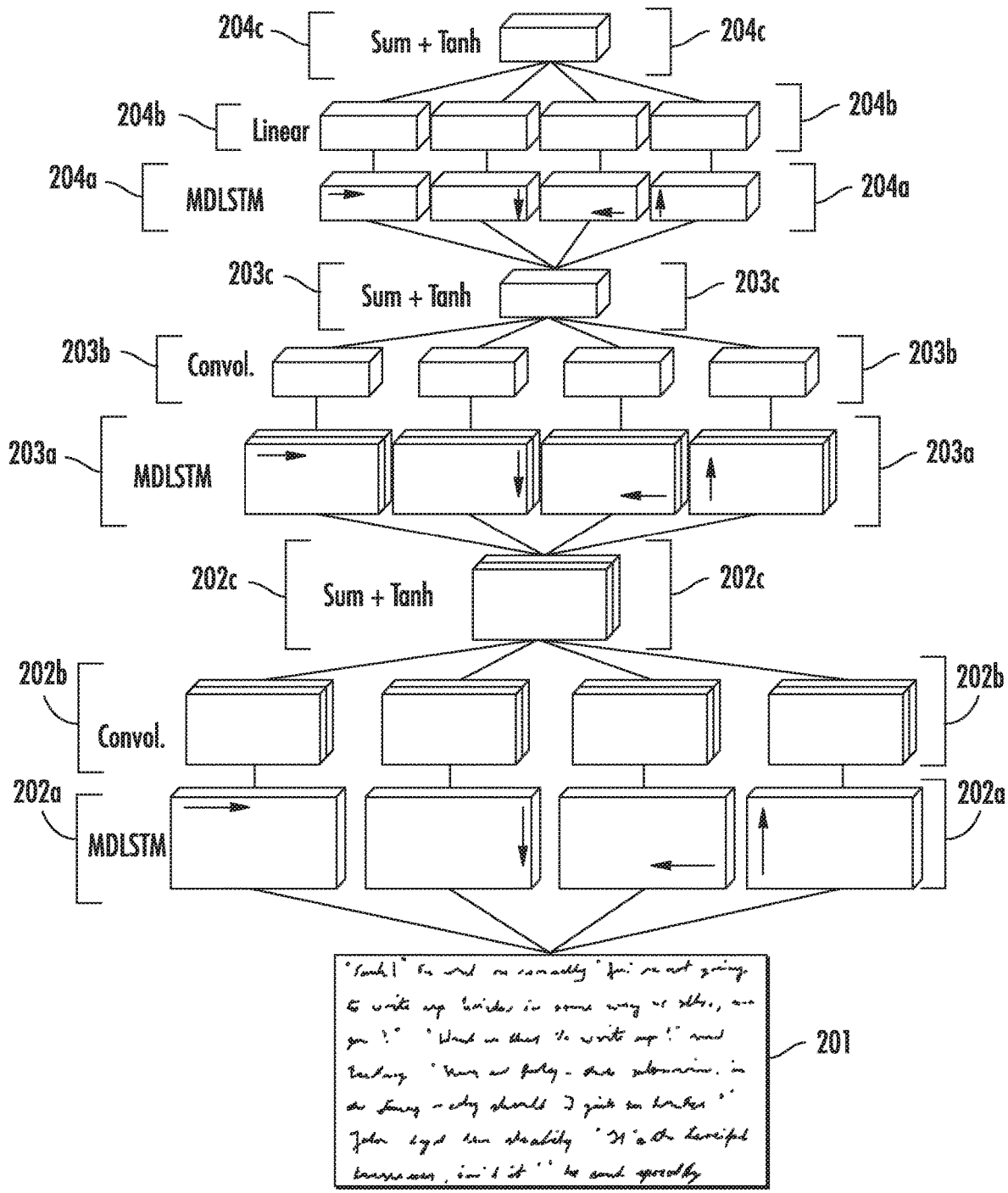
FIG. 2 illustrates an example arrangement of a neural network encoding an image, in accordance with an embodiment of the present disclosure.

The E feature maps are determined once from image I. In some embodiments the function Encoder may be a function realized by the neural network. The neural network utilized in encoder unit 102 may be a multi-dimensional long short-term memory recurrent neural network (MDLSTM-RNN). An example architecture of a neural network utilized in the encoder unit 102 for realizing the Encoder function of (1) is shown in FIG. 2. In FIG. 2, the neural network 200 is an MDLSTM-RNN. Image 201 is presented to the multi-dimensional long short term memory (MDLSTM) layer 202a. The image 201 is the image transmitted by the input unit 101 to the encoder unit 102. In some embodiments, the image 201 is the image captured by the image capturing device 90 of a document, such as document 1. The MDLSTM layer 202a includes four MDLSTM layers, one for each scanning direction. The outputs of the MDLSTM layer 202a are fed into the convolutional layer 202b. The output from the convolutional layer 202b, feature maps 202c, are inputs to the next MDLSTM layer 203a. The output from the MDLSTM layer 203a are inputs to the convolutional layer 203b, and the output from the convolutional layer 203b, feature maps 203c, are inputs to the MDLSTM layer 204b. The outputs from the MDLSTM layer 204b are inputs to the fully connected linear layer 204b. The outputs from the fully connected linear layer 204b are feature maps 204c that comprise the feature vectors $e_{ij}$ described above. The feature maps 204c are not collapsed in the vertical dimension or vertical axis, but are provided to the attention unit 103 as inputs to the attention neural network. Additional details of the attention unit 103 and the attention neural network are described below and in the context of FIG. 3. While only two pairs of MDLSTM and convolutional layers are shown in FIG. 2, those skilled in the art should appreciate that any number of the MDLSTM and convolutional layer pairs may be implemented in the neural network 200.

The MDLSTM-RNN may be trained with a connectionist temporal classification (CTC) function. In some embodiments, the encoder unit 102 may comprise a pre-trained encoder and only the decoder unit 105, described further herein, may be trained to increase the accuracy of identifying each character in image I. In some embodiments, the pre-trained encoder of encoder unit 102 may be further trained along with the training of the decoder unit 105. In some embodiments, the MDLSTM-RNN may be trained along with the decoder unit 105. In some embodiments, the initial values of encoder unit 102 may be based on the training of the model implemented in encoder unit 102. For example, the initial values of the encoder unit 102 may be based on the training of the MDLSTM-RNN.

Encoder unit 102 may be configured to transmit the feature maps that are determined for image I to attention unit 103.

Figure 3A:
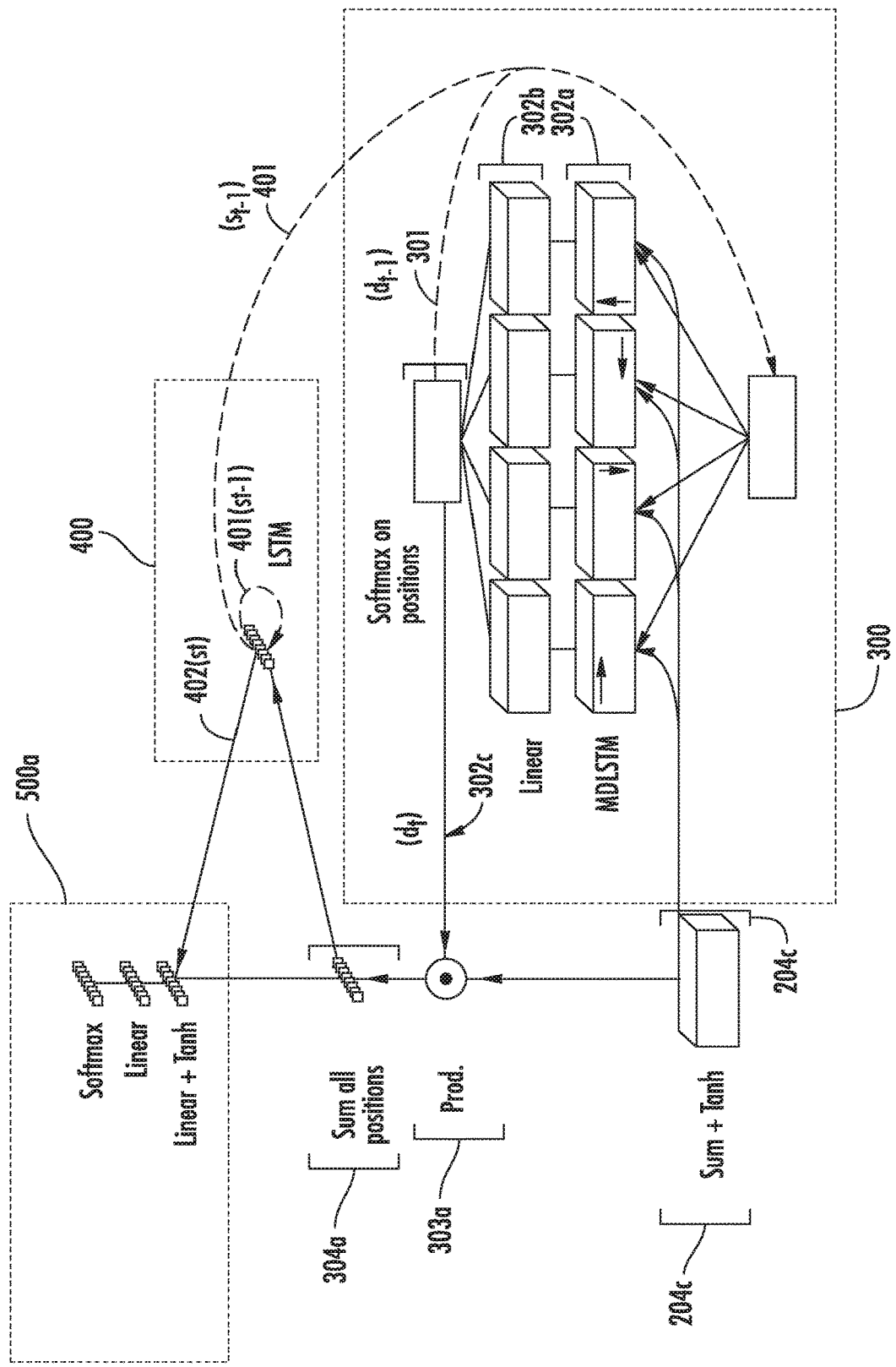
FIGS. 3A-3C illustrate example arrangements of neural networks for determining attention weights, state vectors, and decoding image vectors, in accordance with an embodiment of the present disclosure

Attention unit 103 may be configured to provide a summary of the encoded image at each timestep of an iterative process. A timestep, as described herein, is an iterative step of the iterative process. The iterative process, as described herein, is the process of applying the attention mechanism to the feature maps. The attention mechanism includes applying a map of attention weights to the feature maps. Attention unit 103 may implement the attention mechanism using a neural network. An example architecture of a neural network utilized to implement the attention mechanism in attention unit 103 is shown in FIG. 3A. The neural network 300 is a MDLSTM neural network which outputs a map of attention weights described below. The feature maps 204c and a map of attention weights from a previous timestep (for example map of attention weights at timestep t–1) are inputs to the MDLSTM layer 302a. In some embodiments, Attention unit 103 may receive state information of system 100 from State unit 104 in the form of a state vector, $s_{t-1}$, as shown by reference numeral 401 in FIG. 3A. $s_{t-1}$ is a state vector at timestep t–1 and the state vector has a certain dimension, which is denoted by S. Alternatively, the state information of system 100 may be provided directly to the decoder unit 105 without being provided to the attention unit 103. Additional details of the state vector are described below. The MDLSTM layer 302a includes four MDLSTM layers, one for each scanning direction. The outputs from the MDLSTM layer 302a are inputs to the fully connected linear layer 302b. Based on the inputs of the feature maps 204c, the map of attention weights at a previous timestep 301, and, in some embodiments, the state vector at a previous timestep 401, the MDLSTM layer 302c and the fully connected linear layer 302b, compute attention weights for the feature vectors at each position of the feature maps 204c. Additional details of computing attention weights are described below.

The attention neural network determines a scalar score z(i,j),t for each of the feature vectors $e_{ij}$ at every position (i,j) in the feature maps, at timestep t. The scalar score z(i,j), t may be determined based on the following equation:

$$z_{(i,j),t} = \text{Attention}(e, a_{t-1}, s_{t-1}) \quad (2a)$$

where Attention is a function realized by the neural network, e represents the E feature maps altogether, where each of the feature maps have a dimension of W'×H', and the E feature maps altogether or e has the dimensions of W'×H'×E. $a_{t-1}$ is a map of attention weights at timestep t–1 and has a dimension of W'×H'×1 and, as described above, $s_{t-1}$ is a state vector at timestep t–1 and with a dimension S. The dimension of the state vector may be determined based on the results of the training system 100.

Figure 3B:
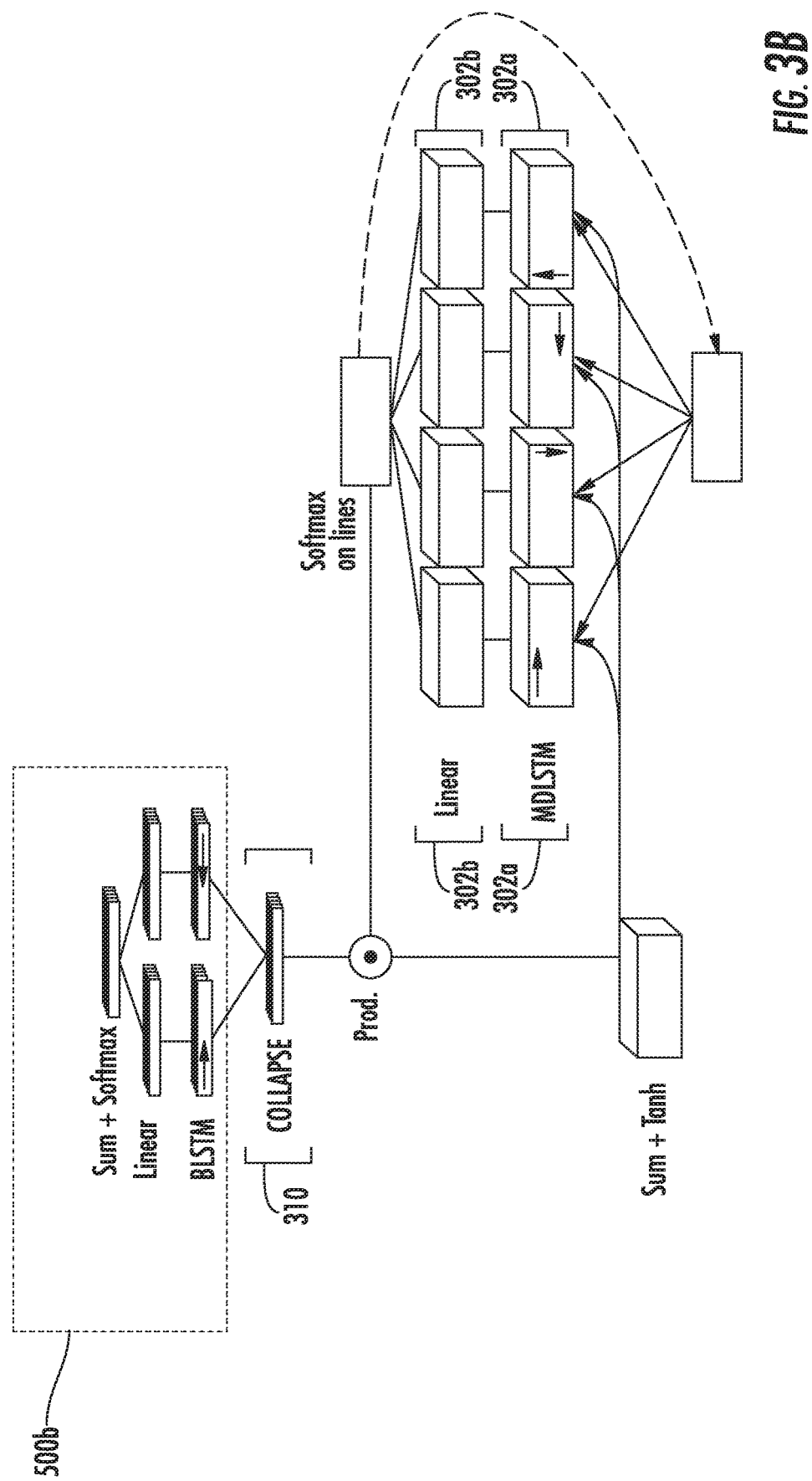
Figure 3C:
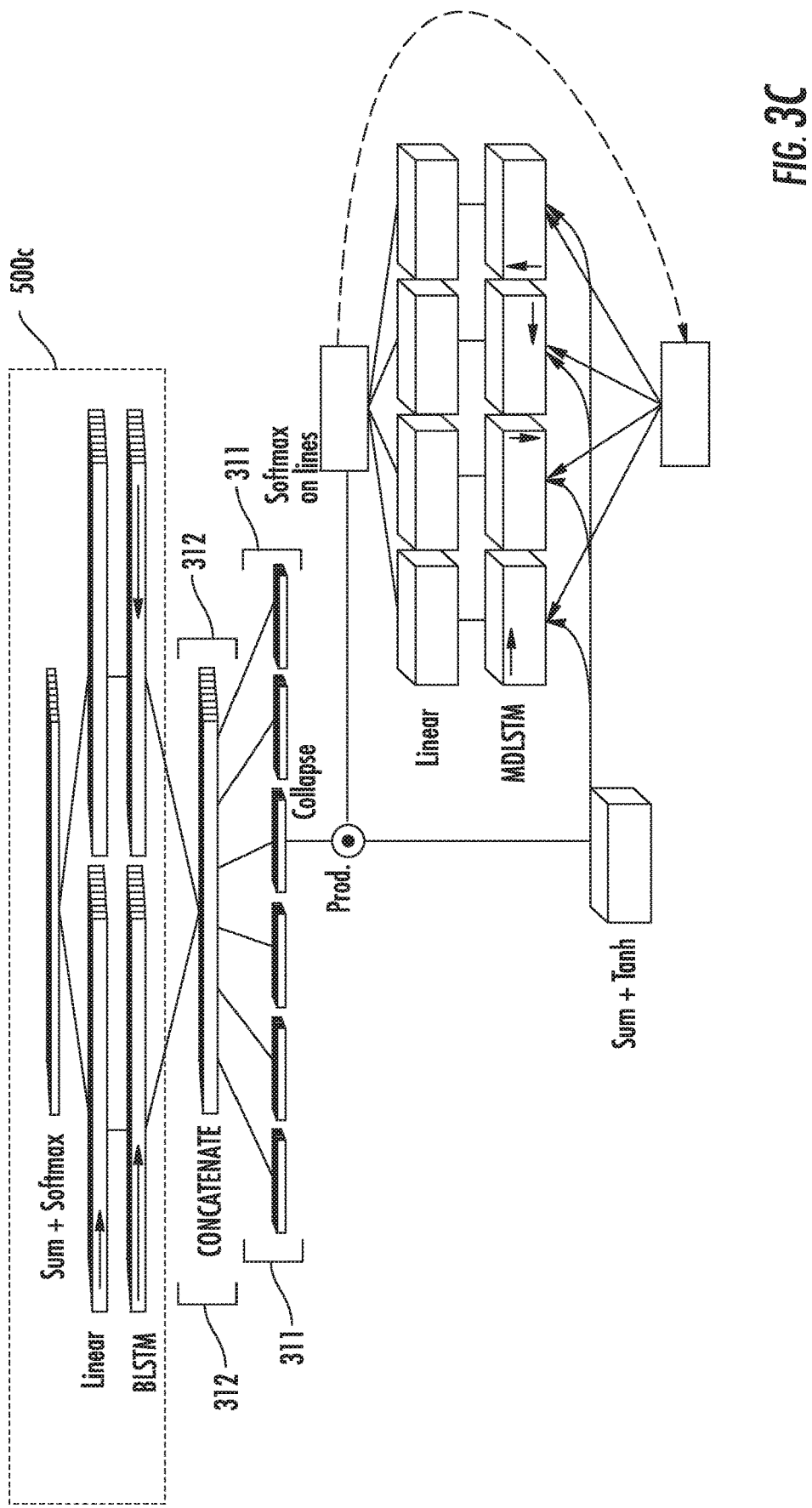

Alternatively, in some embodiments, the scalar score z(i,j),t may be determined based on the following equation:

$$z_{(i,j),t} = \text{Attention}(e, a_{t-1}) \quad (2b)$$

where Attention is a function realized by the neural network, e represents the E feature maps altogether, where each of the feature maps have a dimension of W'×H', and the E feature maps altogether or e has the dimensions of W'×H'×E. $a_{t-1}$ are map of attention weights at timestep t–1 and has a dimension of W'×H'×1. The scalar score $z_{(i,j),t}$ determined based on equation 2b above is not dependent upon the state information of system 100. Examples of neural networks utilized to implement the Attention function in equation (2b) in attention unit 103 are shown in FIGS. 3B and 3C.

The map of attention weights, $a_t$, described above, may be expressed in the form of $a_t = \{a_{(i,j),t}\}$ (1≤i≤W', 1≤j≤H'). In some embodiments, the attention weights $a_{(i,j),t}$ may have an upper bound of 1 and a lower bound of 0 such that the sum of all attention weights equals 1 and can be expressed as follows: $a_{(i,j),t} \in [0,1]$; $\Sigma_{ij} a_{(i,j),t} = 1$. In some embodiments, the attention weights $a_{(i,j),t}$ may have an upper bound of 1 and a lower bound of 0 and the sum of all attention weights may be greater or lesser than 1 or equal to 1. The attention weights of an attention weight vector at a coordinate corresponding to the feature maps may be determined based on the scalar score determined at that coordinate in the feature map. In some embodiments, the attention weights may be determined according to the following equation:

$$a_{(i,j),t} = \frac{e^{z(i,j),t}}{\sum_{i',j'} e^{z(i',j'),t}} \quad (3a)$$

where attention weight vector, $a_{(i,j),t}$, at coordinate (i,j) at time t is based on the exponential function of the scalar score $z_{(i,j),t}$ divided by the sum of the exponential function of scalar scores at all other coordinates $z_{(i',j'),t}$.

In some embodiments, the attention weights of an attention weight vector at a coordinate corresponding to the feature maps may be determined based on scalar scores from the columns of the image I. The attention weights based on the columns of the image or column-wise may be determined according to the following equation:

$$a_{(i,j),t} = \frac{e^{z(i,j),t}}{\sum_{j'} e^{z(i,j'),t}} \quad (3b)$$

where attention weight vector, $a_{(i,j),t}$, at coordinate (i,j) at time t is based on the exponential function of the scalar score $z_{(i,j),t}$ divided by the sum of the exponential function of scalar scores at all row coordinates for a column coordinate. The scalar score $z_{(i,j),t}$ is the scalar score determined using equation (3b). For example, in an image with 20 columns, the attention weight vector at coordinate (0,0) at time 1 is based on the exponential function of the scalar score at coordinate (0,0) at time 1 divided by the sum of the exponential function of scalar scores at all row coordinates of the image for column coordinate 0.

Equation 3b may also be expressed as follows:

$$a_{(i,j),t} = \frac{1}{1 + e^{-z(i,j),t}} \quad (3c)$$

An example architecture of a neural network utilized to implement the attention mechanism that computes attention weights based on columns of the image or column-wise is shown in FIGS. 3B and 3C. As shown in FIGS. 3B and 3C, the softmax normalization of the maps of attention weights output from the linear layer 302b are performed on lines instead of positions as shown in FIG. 3A. Attention unit 103 may be configured to store the attention weight vectors, $a_{(i,j),t}$, or the map of attention weights, $a_t$, in a storage unit.

In some embodiments, in determining scalar scores $z_{(i,j),t}$ according to equation (2a), attention unit 103 incorporates an attention map from a previous timestep or iteration and a state vector from a previous timestep or iteration. In doing so, the Attention function incorporates a location-based attention mechanism by determining the previous attended position from the attention map from the previous timestep, $a_{t-1}$, and the state vector from the previous timestep, $s_{t-1}$. The Attention function also incorporates a content-based attention mechanism based on all the feature maps, represented by e and the state vector from the previous timestep, $s_{t-1}$.

In some embodiments, scalar scores $z_{(i,j),t}$ may be determined according to equation (2b). Attention unit 103, in determining scalar scores $z_{(i,j),t}$ according to equation (2b), may incorporate an attention map from a previous timestep or iteration and feature maps represented by e. The Attention function of equation (2b), similar to equation (2a), incorporates both a location-based attention mechanism and a content-based attention mechanism. The location-based attention mechanism determines the previous attended position based on the attention map from the previous timestep, $a_{t-1}$, and the content-based attention mechanism provides content and context of the whole image I based on all the determined features maps, represented by e. In determining scalar scores $z_{(i,j),t}$ according equation (2b), state information via state vector $s_{t-1}$ may be ignored.

Thus, the attention unit 103 tracks the location and content of received image I in determining the attention weights attention weight vectors and consequently the attention weights are determined based on the context of the whole image I. In some embodiments, the neural network implemented in attention unit 103 may be a MDLSTM recurrent neural network (MDLSTM-RNN) and the Attention function is a function realized by the MDLSTM-RNN.

As described above, attention unit 103 may be configured to provide a summary of the encoded image at each timestep of an iterative process. The summary of the encoded image at timestep t may be represented by a vector $g_t$. The dimension of vector $g_t$ is based on the number of feature maps. As described above, the number of feature maps is represented herein by E. Therefore, vector $g_t$ has a dimension of E.

Vector $g_t$ is determined by applying the attention weight vectors $a_{(i,j),t}$ to the feature vectors $e_{ij}$. The attention vector $g_t$ may be determined according to the following equation:

$$g_t = \Sigma_{i,j} a_{(i,j),t} e_{ij} \quad (4a)$$

where $g_t$, the summary of the encoded image at timestep t, is based on the sum of attention weights applied to each feature vector at every coordinate (i, j) in the feature maps. In some embodiments, as described herein, attention weights being applied to a feature vector include multiplying an encoded value of the attention weight at coordinate (i, j) of the map of attention weights with a feature vector at coordinate (i, j) in all the feature maps. An example of the attention weights being applied to feature vectors of the feature maps and the sum of this product are shown by product 303a and sum 304a, respectively, in FIG. 3A.

In some embodiments, the summary of the encoded image at timestep t may be represented by a sequence of image vectors, $g_t$. The sequence of image vectors $g_t$ may comprise one or more image vectors $g_t^{(i)}$, where the dimension of each image vector $g_t^{(i)}$ is based on the number of feature maps, which is represented herein by E. Therefore, sequence of image vectors $g_t$ may be expressed as:

$$g_t = g_t^{(1)}, g_t^{(2)}, g_t^{(3)}, \ldots, g_t^{(W')} \quad (4b)$$

where W' is the width of the feature maps, and image vector $g_t^{(i)}$ may be determined according the following equation:

$$g_t^{(i)} = \Sigma_j a_{(i,j),t} e_{ij} \quad (4c)$$

where $g_t^{(i)}$, is the summary of the encoded image at timestep t at coordinate (i) and is based on the sum of attention weights applied to each feature vector at every column of the feature maps, represented by j, for a given coordinate (i). The attention weights $a_{(i,j),t}$ in equation (4c) are attention weights based on the columns of the image or column-wise determined using the above described equations (3b) or (3c). Attention weights are applied to a feature vector by multiplying the encoded value of the attention weight with feature vector. The image vector $g_t^{(i)}$ of equation (4c) is shown in FIGS. 3B and 3C as the collapse layer 310. In FIG. 3B, the collapse layer 310 is an individual sequence of image vector at a timestep, and the individual sequence of image vector is transmitted to the decoder unit 105 and a decoder neural network of decoder unit 105 is applied to the individual sequence of image vector. In FIG. 3C, the sequences of image vectors at all time steps, shown in the collapse layer 311, are concatenated at concatenate layer 312, and the concatenated sequence of image vectors at all time steps is transmitted to decoder unit 105 and a decoder neural network of decoder unit 105 is applied to the individual sequence of image vector. Decoding a concatenated sequence of image vectors at all time steps allows system 100 to whole paragraphs and reduce errors in identifying line beginnings and endings.

Referring back to FIG. 3A, the Attention unit 103 may be configured to transmit the summary of the encoded image, vector $g_t$, to State unit 104 and Decoder unit 105, as shown in FIG. 3A. In some embodiments, attention unit 103 may be configured to transmit the summary of the encoded image, vector $g_t$ to only Decoder unit 105 without transmitting vector $g_t$ to State unit 104. Attention unit 103 may also be configured to transmit the sequence of image vectors $g_t$, to State unit 104 and Decoder unit 105, or only to decoder unit 105 without transmitting the sequence of image vectors $g_t$ to the State unit 104.

An example of a system incorporating an attention unit using equations (3b), (3c), (4b), and (4c) are further described in Appendix B: "Joint Line Segmentation and Transcription for End-to-End Handwritten Paragraph Recognition," Appendix E: "Joint Line Segmentation and Transcription for End-to-End Handwritten Paragraph Recognition" and Appendix C: "Attention-Based Neural Networks for End-to-End Handwriting Recognition." The entire contents of each of Appendix B, Appendix C, and Appendix E is hereby incorporated by reference into the present disclosure.

State unit 104 may be configured to determine a state vector at time t, represented herein as $s_t$. State vector $s_t$ allows system 100 to track the progression of end-to-end text recognition. State unit 104 may utilize a long short-term memory (LSTM) recurrent neural network to determine the state vector $s_t$. An example architecture of a neural network utilized to determine the state vector in state unit 104 is neural network 400, shown in FIG. 3A. The neural network 400 in FIG. 3A is an LSTM recurrent neural network. State vector $s_t$ may be determined by the following equation:

$$s_t = \text{LSTM}(s_{t-1}, g_t) \quad (5)$$

where the output of a LSTM recurrent neural network is based on the state vector from previous timestep or iteration, $s_{t-1}$, and the summary of the encoded image at timestep t or the current iteration, $g_t$. After determining the state vector $s_t$, State unit 104 transmits the state information of system 100 as state vector $s_t$ to decoder unit 105.

In some embodiments, system 100 may include an input unit, an encoder unit, an attention unit, and a decoder unit, such as input unit 101, encoder unit 102, attention unit 103, and decoder unit 105. A state unit, such as state unit 104, may be incorporated within the decoder unit, such as decoder unit 105. In embodiments where a decoder unit incorporates or includes a state unit, a state vector, $s_t$, may be determined by decoder unit 105. In some embodiments, decoder unit 105 may determine state vector, $s_t$, by equation 5. In some embodiments where a decoder unit incorporates or includes a state unit, state vector, $s_t$, may be provided to the attention unit 103 as an additional input into attention unit 103 and attention unit 103 may be configured to determine the attention weights at the next timestep, t+1, based in part on the state vector.

Decoder unit 105 may be configured to predict the next character based on the current summary of the encoded image and, in some embodiments, also based on the state information. Example architectures of neural networks utilized by the Decoder unit 105 are neural networks 500a, 500b, 500c, as shown in FIG. 3A, FIG. 3B, and FIG. 3C, respectively. Decoder unit 105 may receive state information from State unit 104 and the summary of the encoded image from Attention unit 103, as shown in FIG. 3A. Decoder unit 105 determines a probability of the next character in image I. Decoder unit 105 may be configured to determine a probability of each character in a language and store the probability values in a vector of the size of all the characters plus one to include a special token character to represent the end of image I. The probability value of the next character is bounded by an upper bound of one and a lower bound of zero.

Decoder unit 105 may determine the probability values of the next character in the image I at timestep t according to the following equation:

$$y_t = \text{Decoder}(s_t, g_t) \in [0,1]^{L+1} \quad (6a)$$

where $y_t$ is a vector of size L+1 and L equals the number of all characters in a language, including, but not limited to, lowercase and uppercase alphabets, numerals, punctuation symbols, such as comma and exclamation mark, inter-word space, currency symbols, and other characters used in general by the population speaking and writing in that language. The size of $y_t$ is increased by at least one more to incorporate an end of sequence token. The end of sequence token, may be represented by <EOS> and may indicate the end of image I. Probability vector $y_t$ at timestep t is determined based on state vector $s_t$ received from State unit 104, at timestep t, and encoded image summary vector $g_t$, received from Attention unit 103, at timestep t. The Decoder function is a function realized by a neural network implemented by Decoder unit 105. The values in the probability vector are bounded within zero and one.

In some embodiments, each dimension in the probability vector $y_t$ may represent a character in a language. For example, the first dimension or the zero index of the probability vector $y_t$ may represent the letter 'a', the second dimension or the first index may represent the letter and so on. Each dimension in the probability vector $y_t$ may comprise a probability value that indicates the likelihood that the next character in image I is the character represented by that dimension. The dimension including the highest value will be determined to be the next character in the sequence.

In some embodiments, decoder unit 105 may also be configured to predict the next character based on the current summary of the encoded image without the state information (as shown in FIGS. 3B and 3C) and decoder unit 105 may be configured to determine the probability values of the next character in the image I at timestep t according to the following equation:

$$y_t = \text{Decoder}(g_t) \in [0,1]^{L+1} \quad (6b)$$

where probability vector at timestep t, $y_t$ is determined based on encoded image summary vector $g_t$, received from Attention unit 103 at timestep t. Probability vector $y_t$ is a vector of size L+1. As described above, L equals the number of all characters in a language, including, but not limited to, lowercase and uppercase alphabets, numerals, punctuation symbols, such as commas and exclamation marks, inter-word spaces, currency symbols, and other characters used in general by the population speaking and writing in that language. The Decoder function is a function realized by a neural network implemented by decoder unit 105.

Decoder unit 105 may also be configured to predict a subsequence of characters. The subsequence of characters may be a line of characters in a given line in the image I. Decoder unit 105 may receive a sequence of image vectors, $g_t$ from attention unit 103. Decoder unit 105 may determine a sequence of probability vectors $y_t$. The sequence of probability vectors $y_t$ may comprise one or more probability vectors $y_t^{(j)}$. Probability vector $y_t^{(j)}$ represents the likelihood of a character at a location in image I corresponding with column j for a given row or line in image I. The location in image I corresponding with column j may be determined based on the one or more feature maps that are determined from image I. Similar to probability vector $y_t$, each dimension of probability vector $y_t^{(j)}$ may represent a character in a language and each dimension in the probability vector $y_t$ may comprise a probability value that indicates the likelihood of the character at column j of the image I.

The sequence of probability vectors $y_t$ described above may be expressed as $y_t = y_t^{(1)}, y_t^{(2)}, y_t^{(3)}, \ldots, y_t^{(W')}$, where $y_t^{(1)}, y_t^{(2)}, y_t^{(3)}, \ldots, y_t^{(W')}$ are probability vectors corresponding to columns 1, 2, 3, W' of feature maps determined from image I, which, in turn, correspond to the corresponding columns of image I. W' is the maximum width of the feature maps. Decoder unit 105 may determine the sequence of probability vectors $y_t$ according to the following equation:

$$y_t = \text{Decoder}(s_t, g_t) \in [0,1]^{W' \times L+1} \quad (6c)$$

where $y_t$ is a matrix of dimension (L+1, W'). L, as described above, is a value that equals the number of all characters in a language, including, but not limited to, lowercase and uppercase alphabets, numerals, punctuation symbols, such as commas and exclamation marks, inter-word spaces, currency symbols, and other characters used in general by the population speaking and writing in that language. One of the dimensions of $y_t$ is increased by at least one more, such as L+1, to incorporate an end of sequence token, which may be represented by <EOS> and may indicate the end of the image I. $s_t$ is the state vector that decoder unit 105 may have received from state unit 104. $g_t$ is the sequence of image vectors received from attention unit 103. Decoder unit 105 may also determine the sequence of probability vectors $y_t$ without using the state vector. Decoder unit 105 may determine the sequence of probability vectors $y_t$ according to the following equation:

$$y_t = \text{Decoder}(g_t) \in [0,1]^{W' \times L+1} \tag{6d}$$

where $g_t$ is the sequence of image vectors received from attention unit 103. The Decoder functions in equations (6c) and (6d) are functions realized by a neural network implemented by decoder unit 105.

Decoder unit 105 that may determine the sequence of probability vectors may provide, in one timestep, as an output of system 100, the transcription of a complete line in an image I. Decoder unit 105 that determines the sequence of probability vectors and provides, as an output, the transcription of a complete line may require fewer time steps to transcribe a paragraph, thus resulting in a computationally less expensive system.

In some embodiments, decoder unit 105 may implement multi-layer perceptrons (MLP) with an input layer, a hidden layer, and an output layer. An example of the MLP in decoder unit 105 is illustrated in FIG. 2 of Appendix A: "Scan, Attend, and Read: End-to-End Handwritten Paragraph Recognition with MDLSTM Attention," and Appendix D: "Scan, Attend and Read: End-to-End Handwritten Paragraph Recognition with MDLSTM Attention." Examples of outputs from decoder unit 105 are further described in Appendix A: "Scan, Attend, and Read: End-to-End Handwritten Paragraph Recognition with MDLSTM Attention," Appendix D: "Scan, Attend and Read: End-to-End Handwritten Paragraph Recognition with MDLSTM Attention," and Appendix E: "Joint Line Segmentation and Transcription for End-to-End Handwritten Paragraph Recognition." Additionally, examples of multi-line recognition are further described in Appendix A: "Scan, Attend, and Read: End-to-End Handwritten Paragraph Recognition with MDLSTM Attention," Appendix D: "Scan, Attend and Read: End-to-End Handwritten Paragraph Recognition with MDLSTM Attention," and Appendix E: "Joint Line Segmentation and Transcription for End-to-End Handwritten Paragraph Recognition." The entire contents of each of Appendix A, Appendix D, and Appendix E is hereby incorporated by reference into the present disclosure.

Decoder unit 105 may be configured to determine a character based on the probability vector or a line or sequence of characters based on the sequence of probability vectors, and transmit the determined character or line or sequence of characters to display device 91. In some embodiments, one or more instructions may be stored within the one or more memory units of system 100 and system 100, using the one or more processors of system 100, may determine, based on the one or more instructions within the one or more memory units and the probability vector or a line or sequence of characters, a character or a line or sequence of characters and transmit the character or a line or sequence of characters to display device 91.

Display device 91 may be configured to display the received characters or the line or sequence of characters as depicted by display 92. Thus, display 92 displays the characters recognized by system 100 from image I.

The various parameters within system 100, described above, may be trained using backpropagation techniques and the cost or the error rate of system 100 may be optimized. In some embodiments, the cost or error rate of system 100 may be optimized according to the following equation:

$$L(I,y) = -\Sigma_t \log p(y_t | I) \tag{7}$$

where I is the image and y are all the characters that have been predicted by system 100 over the iterative process from $t=1$ to $t=T$. y, which may be expressed as $y = y_1, y_2, y_3, \ldots, y_T$. $p(y_t | I)$, is the output of the system 100 at timestep t for image I. y represents all the characters in the image that system 100 should predict accurately. In other words, y represents all the characters that are the target characters in the image and the target characters are determined based in part on the training of the neural networks of system 100.

Thus, system 100, as described above, may recognize text in digitized document images without explicit line, word, or character segmentation. Additionally, system 100, as described above, also takes into consideration the entire digitized document image and predicts weights at every corresponding position of the digitized document image. Furthermore, system 100, as described above, also provides techniques for recognizing multiple lines of text without utilizing any line segmentation.

Figure 4A:
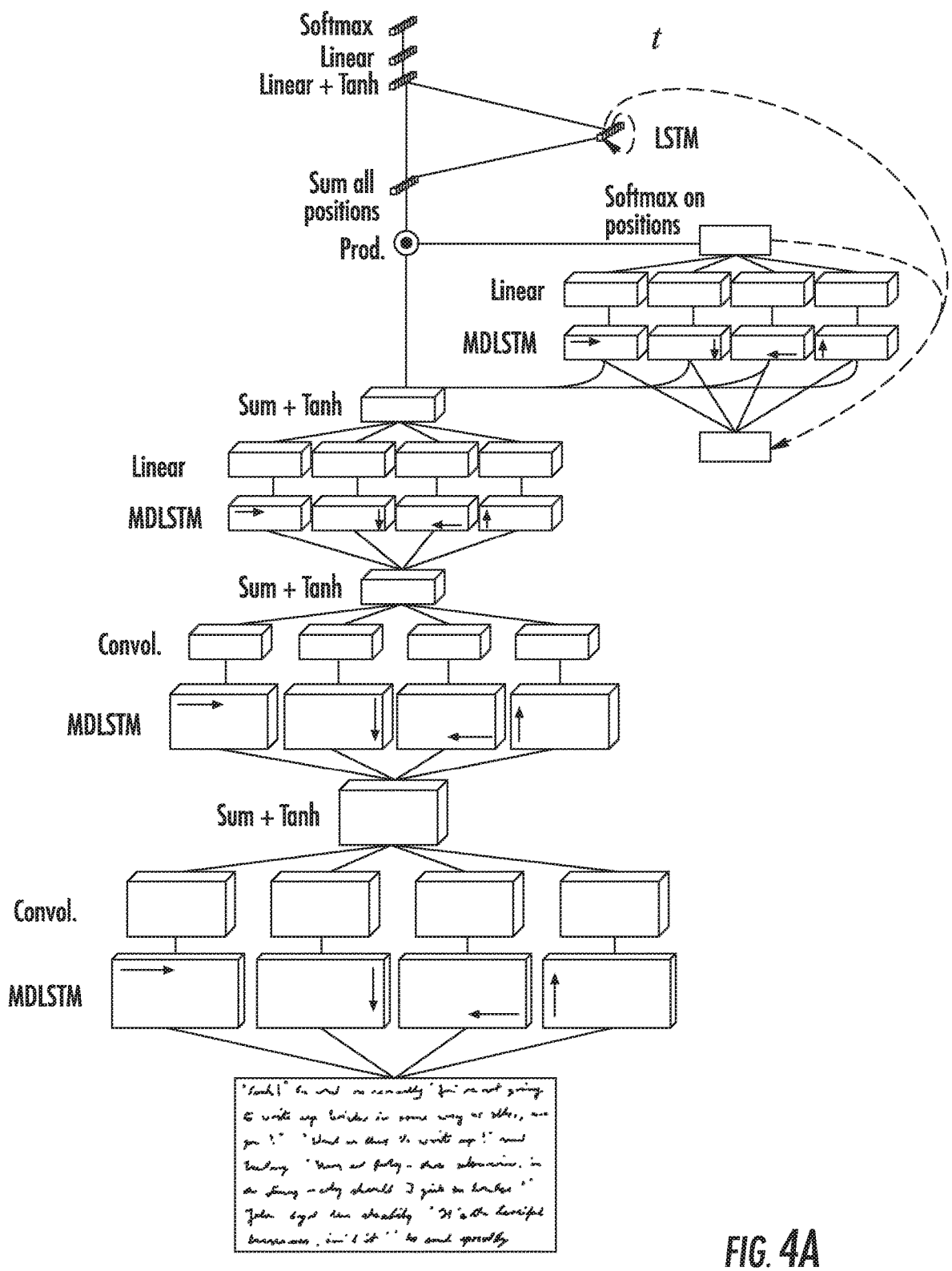
FIGS. 4A-4C illustrate example arrangements of neural networks for encoding images, in accordance with an embodiment of the present disclosure.
Figure 4B:
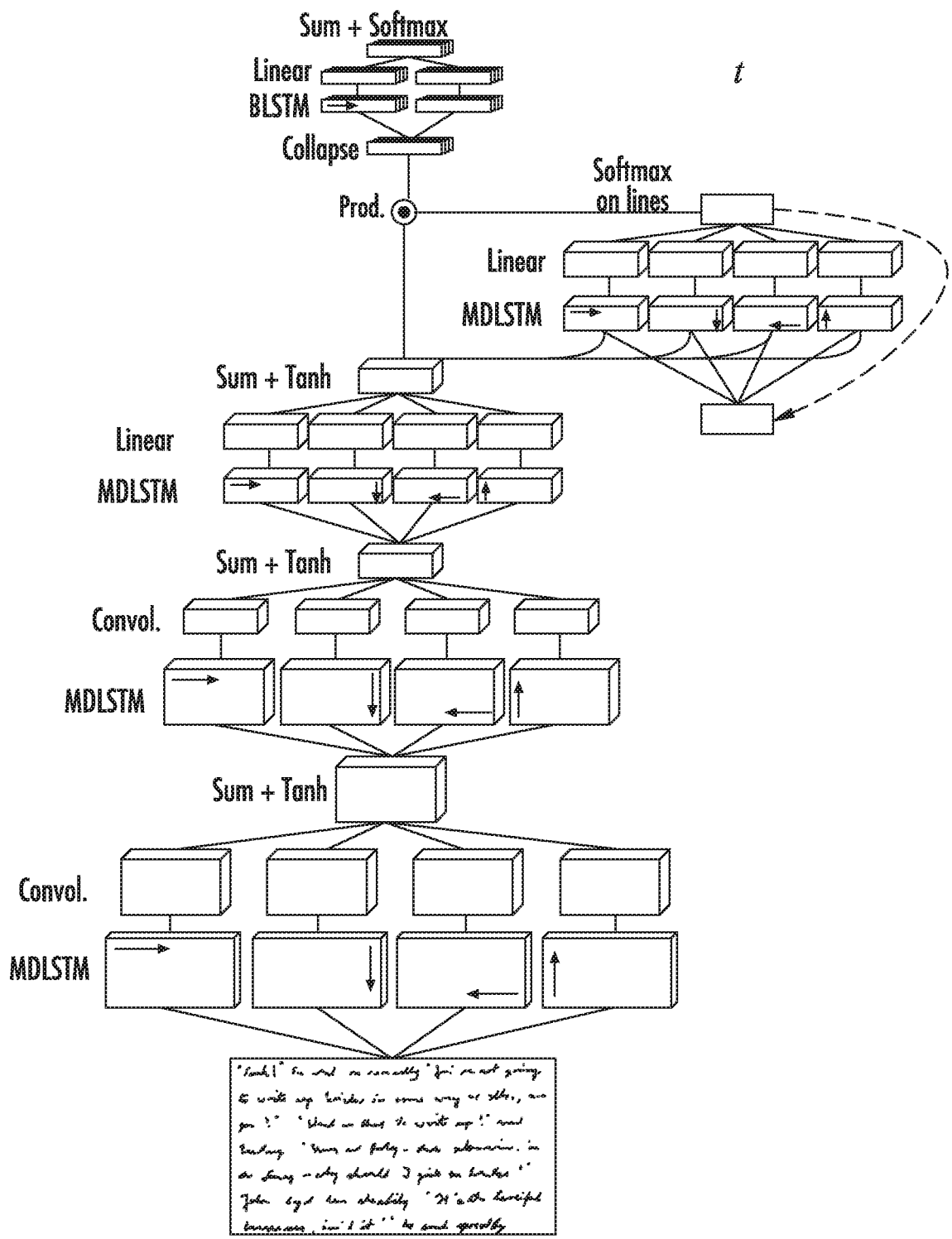
Figure 4C:
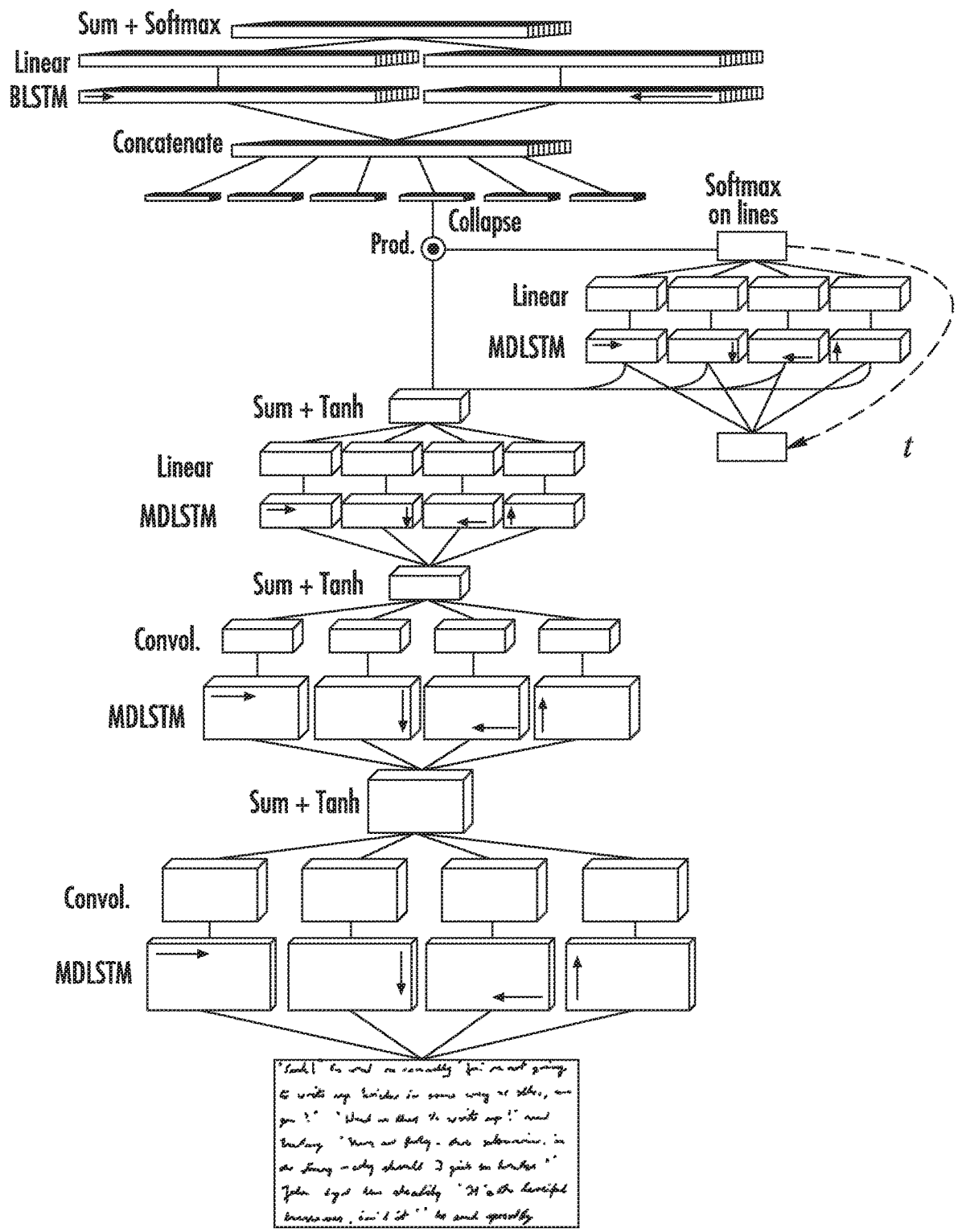

FIGS. 4A-4C illustrate an arrangement of all the neural networks of the above-described units of system 100. FIG. 5 illustrates recognition of characters over multiple lines in images including handwritten characters without segmentation of lines.

Figure 6:
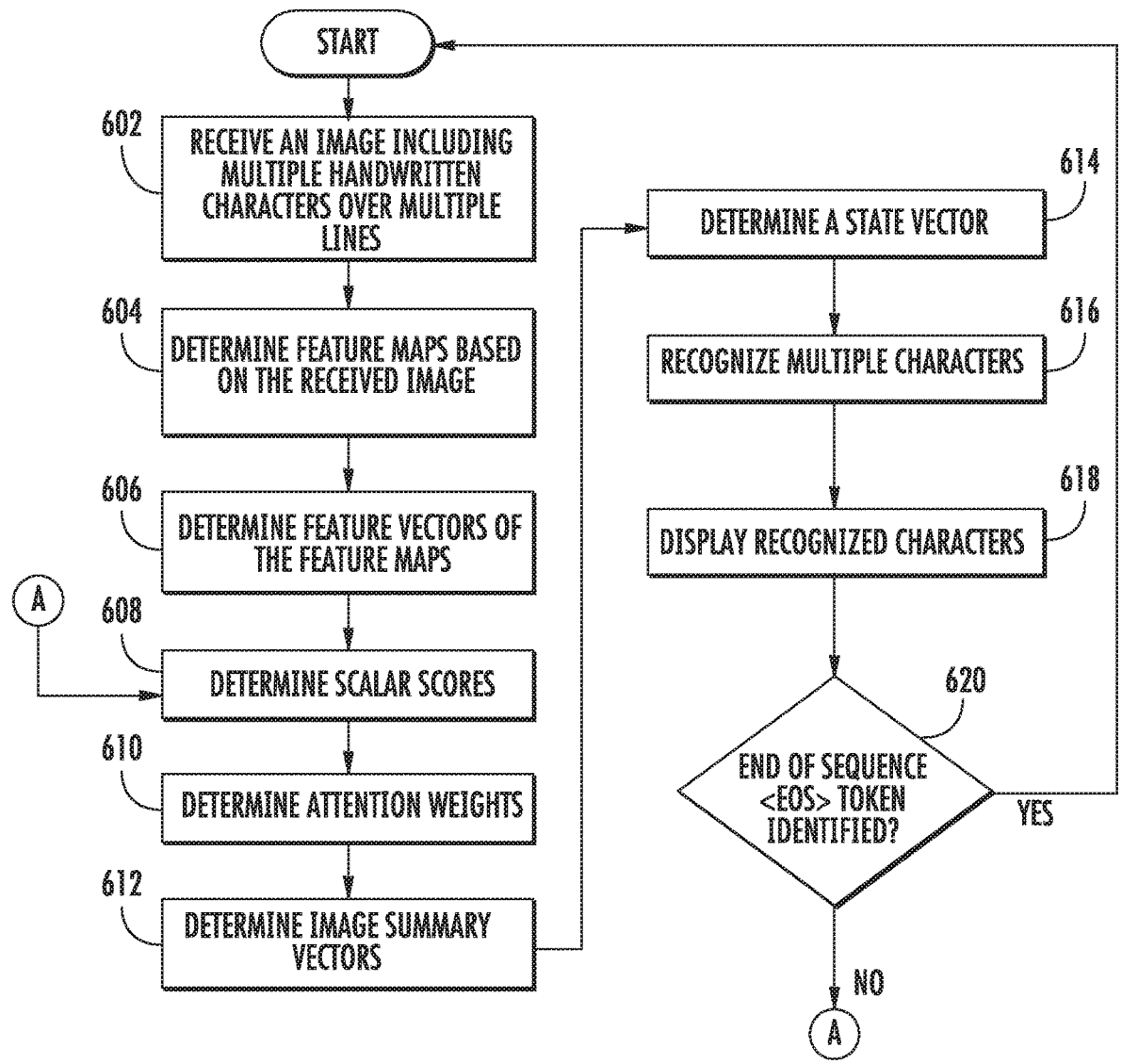
FIG. 6 illustrates a method of recognizing and/or identifying characters over multiple lines in images that include handwritten characters over multiple lines, in accordance with an embodiment of the present disclosure.

Turning now to FIG. 6, there is shown a method 600 of employing the configuration of the units of the system 100 to recognize and/or identify characters over multiple lines in images that include handwritten characters over multiple lines. In step 602, system 100, receives an image that includes multiple handwritten characters over multiple lines. As described above, an image capturing device may be operably coupled to system 100 and configured to capture images and transmit the captured images to system 100 or input unit 101 of system 100.

In step 604, system 100 determines feature maps based on the received image, and in step 606, the system 100 determines feature vectors within the feature maps. As described above, the system 100 employs a encoder to neural network to determine feature maps based on the received image. In step 608, the system 100 determines multiple scalar scores are determined. As described above, the scalar scores are determined based in part on an attention function with the inputs of the feature maps determined in step 604 and a map of attention weights from a previous timestep. In some embodiments the scalar scores are determined based on a state vector from a previous time step.

In step 610, the system 100 determines the attention weights. The attention weights are determined based on the scalar scores using the equations described above. In step 612, the system 100 determines image summary vectors based on the attention weights determined in step 610 and the feature maps determined in step 604. In step 614, a state vector is determined. The initial parameters for the state vector are pre-determined and are based on the results during the training of the system 100 in recognizing characters from an image. The parameters of the state vector change to new values at every timestep based on the input values to the neural network of the state unit 104.

In step 616, the system 100 recognizes one or more characters in the image received in step 602. The system 100 recognizes the characters using the neural networks of the decoder unit 105 described above. In step 618, the system 100 displays the recognized characters on a display. As described above, the system 100 is configured within a computing device and, in some embodiments, the image capturing device and a display are configured within the same computing device, for example, a mobile computing device, such as a smartphone.

In step 620, the system 100 determines whether an end of sequence <EOS> token is identified while recognizing characters in step 616. As described above, an <EOS> token indicates to the system 100 that the end of the image has been reached and that further processing of the image is not required. In response to determining that an <EOS> token has not been received, the system 100 continues with the processing of the image received in the step 602 by iterating to the next timestep and performing steps 608 through 618. In response to determining that the <EOS> token has been identified, the system 100 terminates further processing of the received image in step 602, and waits to begin performance of method 600 on a new image.

Examples of system 100, encoder unit 102, attention unit 103, state unit 104, and decoder unit 105 described herein are described in one or more of the following: Appendix A: "Scan, Attend and Read: End-to-End Handwritten Paragraph Recognition with MDLSTM Attention," Appendix B: "Joint Line Segmentation and Transcription for End-to-End Handwritten Paragraph Recognition," Appendix C: "Attention-Based Neural Networks for End-to-End Handwriting Recognition," Appendix D: "Scan, Attend and Read: End-to-End Handwritten Paragraph Recognition with MDLSTM Attention," and Appendix E: "Joint Line Segmentation and Transcription for End-to-End Handwritten Paragraph Recognition." The entire contents of each of Appendix A, Appendix B, Appendix C, Appendix D, and Appendix E is hereby incorporated by reference into the present disclosure.

Although the illustrative embodiments of the present disclosure have been described herein with reference to the accompanying drawings, it is to be understood that the disclosure is not limited to those precise embodiments, and that various other changes and modifications may be effected therein by one skilled in the art without departing from the scope or spirit of the disclosure.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The systems and methods described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs), Graphical Processing Units (GPUs), and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, meta-languages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more machine-readable media or memory. The term "memory" may include a mechanism that provides (e.g., stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for recognizing a plurality of handwritten characters over multiple lines in an image, the system comprising:
a neural network configured to receive the image, the neural network including:
a cascade of a plurality of pairs of a first long short-term memory (LSTM) layer and a convolution layer, wherein each first LSTM layer is configured to generate a first output according to a scanning direction, each convolution layer is configured to generate a feature map based on the first output from a corresponding first LSTM layer in the pair, and feature maps generated by a plurality of pairs are inputted to a next plurality of pairs in the cascade;

a second LSTM layer configured to generate a second output from a plurality of features maps generated by a last plurality of pairs in the cascade; and a linear layer configured to generate final feature maps based on the second output, wherein the final feature maps include a feature vector at each grid thereof;

a weight calculator configured to calculate a weight vector for each grid of the final feature maps to generate an image summary; and a decoder configured to determine a probability of each character in the image based on the image summary and the final feature maps.

2. The system according to claim 1, wherein a dimension of the feature maps is less than or equal to a dimension of the image.

3. The system according to claim 1, wherein a number of scanning directions is four.

4. The system according to claim 3, wherein the scanning directions include upward and downward in a vertical direction and backward and forward in a horizontal direction.

5. The system according to claim 1, wherein a number of convolution layers in the plurality of pairs is four.

6. The system according to claim 1, wherein a dimension of the weight vector is a number of the final feature maps.

7. The system according to claim 1, wherein the neural network is further configured to generate an attention vector for each grid based on a corresponding weight vector and a corresponding feature vector of the final feature maps.

8. The system according to claim 7, wherein attention vectors for all grids of the final feature maps are the image summary.

9. The system according to claim 1, wherein the neural network further includes a collapse layer configured to concatenate sequences of attention vectors to generate a concatenated sequence of image vectors.

10. The system according to claim 9, wherein the decoder is further configured to decode the concatenated sequence to identify line beginnings and endings of whole paragraphs in the image.

11. A method for recognizing a plurality of handwritten characters over multiple lines in an image, the method comprising:

generating, by each of a plurality of first long short-term memory (LSTM) layers, a first output according to a scanning direction, wherein each first LSTM layer is paired with a convolution layer;

generating, by each of a plurality of convolution layers, a feature map based on the first output from a corresponding first LSTM layer in the pair;

iterating generating the first output and generating the feature map in a cascade manner;

generating, by a second LSTM layer, a second output from a plurality of feature maps generated by a plurality of pairs of the first LSTM layers and the convolution layers;

generating, by a linear layer, final feature maps based on the second output, wherein the final feature maps include a feature vector at each grid thereof;

calculating a weight vector for each grid of the final feature maps to generate an image summary; and determining a probability of each character in the image based on the image summary and the final feature maps.

12. The method according to claim 11, wherein a dimension of the feature maps is less than or equal to a dimension of the image.

13. The method according to claim 11, wherein a number of scanning directions is four.

14. The method according to claim 13, wherein the scanning directions include upward and downward in a vertical direction and backward and forward in a horizontal direction.

15. The method according to claim 11, wherein a number of convolution layers in the plurality of pairs is four.

16. The method according to claim 11, wherein a dimension of the weight vector is a number of the final feature maps.

17. The method according to claim 11, further comprising generating an attention vector for each grid based on a corresponding weight vector and a corresponding feature vector of the final feature maps.

18. The method according to claim 17, wherein attention vectors for all grids of the final feature maps are the image summary.

19. The method according to claim 11, further comprising concatenating sequences of attention vectors to generate a concatenated sequence of image vectors.

20. The method according to claim 19, wherein the concatenated sequence is decoded to identify line beginnings and endings of whole paragraphs in the image.

* * * * *